Patented May 2, 1939

2,156,310

UNITED STATES PATENT OFFICE 2,156,310

ASBESTOS CEMENT SHINGLE AND PROCESS OF MAKING THE SAME

Charles Schuh, Brooklyn, N. Y., assignor, by mesne assignments, to Bakelite Building Products Co., Inc., a corporation of Delaware No Drawing. Application January 23, 1936, Serial No. 60,447. Renewed July 11, 1938

21 Claims. (Cl. 92—21)

The present invention relates to low density shingles and, more particularly, to a low density asbestos cement shingle of improved character and to a low pressure process of producing low density asbestos cement shingles.

As those skilled in the art know, conventional asbestos cement shingles obtainable in the trade had a number of important disadvantages. To name a few of these disadvantages, conventional shingles have been relatively heavy and expensive, they have not been architecturally correct and, in addition, they afforded but little protection against heat or cold. A further disadvantage of conventional asbestos cement shingles was that they have been subject to condensation and to the penetration of moisture.

In order to be architecturally correct, the shingle must have a minimum thickness so that when placed in position on a roof the shadow effect and general appearance should provide a well-balanced architectural design. The finished roof must not appear too flat or smooth, nor too thin, nor give the impression of not being substantial enough. Conventional asbestos cement shingles did not have any of these important qualities. On the average, they were only about $\frac{3}{16}$" in thickness, many of them being entirely flat, the tapered ones usually were only about $\frac{1}{4}$" at the butt. It has been repeatedly stated by architects of distinction that where an architecturally correct roof is desired, the asbestos cement shingle does not at all enter the competition as a roofing material.

Various attempts have been made to increase the thickness of asbestos-cement shingles and in some cases tapered shingles of $\frac{7}{16}$" at the butt were marketed. When it is considered that even a $\frac{1}{4}$" butt tapered shingle will weigh about 2 lbs. it can easily be seen that increasing the thickness to the desired $\frac{1}{2}$" to $\frac{3}{4}$" would make the weight excessive and cost prohibitive. Although from time to time numerous suggestions and proposals have been made to eliminate the above disadvantages of conventional asbestos-cement shingles, none, as far as I am aware, of these suggestions and proposals was completely satisfactory and successful when carried into practice on a commercial and industrial scale.

I have discovered that the problem may be solved in a remarkable and surprising manner.

It is an object of the present invention to provide a cement shingle of improved character having low density and ample strength which may be manufactured in architecturally correct dimensions without its weight or cost being excessive.

It is another object of the present invention to provide a cement shingle having a honeycomb-like structure and evenly distributed microscopic voids and as a consequence of such structure possessing excellent heat insulating properties.

It is a further object of the invention to provide a cement shingle having a reduced amount or no asbestos embodied therein.

The invention also contemplates an improved cement shingle which may be readily produced on a commercial and industrial scale at a low cost without the necessity of applying considerable pressures by means of hydraulic presses and the like.

Other and further objects and advantages of the invention will become apparent from the following description.

Generally speaking, according to the present invention the desired increased thickness of the asbestos-cement shingle is obtained without increasing the weight by means of decreasing the density of the material. As far as I am aware, it has been firmly established in the art that it is impossible to produce satisfactory asbestos cement shingles without embodying substantial amounts of asbestos fibres and without the application of high and heavy pressures of the order of 8,000 to 10,000 lbs. per square inch.

The present invention completely departs from these conventional principles and employs neither asbestos as a binder nor heavy pressure to make the shingle. I have discovered that, contrary to accepted prior belief, asbestos as a binder may be dispensed with wholly or to a great extent and that low pressures such as 10 pounds per square inch, may be employed with satisfactory results.

According to prior standard practice, a fairly good grade of asbestos was used in the manufacture of asbestos cement shingles in the amount of 17%, a Portland cement being used for the remaining 83%. The function of asbestos was considered to be primarily that of a reinforcing element and therefore preference was given to fibres of good average length which were most expensive to obtain. The fibre also functions to produce the matte on the paper machine in the process of manufacture. During the conventional manufacturing process, the shingles were subjected to a high finishing pressure of about 8,000 to 10,000 pounds per square inch and the resultant density of the finished product is generally about 120 pounds per cubic foot.

In direct contrast to the prior established principles of manufacture described hereinabove, I may employ only one-half of the amount of asbestos fibre, say about 8%, and use preferably short fibres. I pulp and cut up the fibres to a much greater extent than was customary heretofore and obtain an asbestos pulp which has a non-settling volume many times greater than that of conventional pulps. The Portland cement is intimately dispersed into this medium by high speed mixing. I have found that in this manner, it is possible to obtain a greatly extended volume of cement asbestos pulp which when allowed to settle will have an appreciable tendency to flocculate and after settling will still maintain a large volume due to the flocculated asbestos fibres arranging themselves in all directions with a substantial portion laying parallel to the direction of settling. This new effect obtained by the present invention is in contrast to prior effects which involved a tendency of the comparatively long fibres of flattening themselves out when allowed to settle into a plane perpendicular to the direction of settling and which involved the production of a product containing a small volume of settled material. My present pulp mixture settles much slower than conventional pulp and during the settling of my present pulp, there is no tendency of the cement particles to segregate toward the bottom of the settled layer by relatively faster settling which is exactly what has happened in the conventional pulp mixtures.

There appears to be two actions which take place in pulping asbestos according to the principles of my present invention. First, the asbestos fibres consisting of bundles of individual fibres are torn apart and second, the fibres themselves are cut and torn to smaller lengths. Since the fibres are very thin and hairlike, if sufficiently torn apart they have a tendency of curling up and of increasing the volume of the settled pulp and of causing a flocculating effect of the short fibres. In addition to the short fibres, I provide a minor portion of long, hairlike fibres which are generally still sufficiently strong to be effective as reinforcement elements. In pulping asbestos, it is preferable according to the present invention to subject the asbestos to a type of physical action which will result in the production of a large percentage or major portion of small flocculating fibres and a minor portion of long, hairlike fibres. For the production of my special pulp, I have obtained satisfactory results by simply using a sharp high speed propeller type of mixer.

It is to be observed that an important phase of this invention resides in the discovery and recognition of a change in the physical structure of the finished product which results in the cement-fibre composition when the fibre portion comprises a substantial proportion of flocculating fibres. This is especially true when the product is made by the extraction of water from a relatively dilute aqueous suspension, as is the case in the manufacture of asbestos cement shingles by my invention. Due to the fact that the fibres flocculate, the cement particles are prevented from assuming a uniform volumetric distribution and have a tendency of adhering to the fibres in this flocculated condition. The result is a physical structure comprising a sort of honeycomb of cement particles with fibres distributed throughout which when compressed to its final form produces a finished product having a large percentage of evenly distributed fine voids of microscopic order or the like containing minute fibrous elements dispersed therein.

The honeycomb-like structure has the effect of lowering the density of the finished product without introducing detrimental visible voids. Moreover, the physical structure is substantially uniform throughout the product, which is of considerable practical importance. Another important advantage of my honeycomb-type of structure is that while the overall density of the product is greatly reduced by the formation of uniformly distributed microscopic fibre aggregates, the specific density of the walls of the honeycomb cement structure is not necessarily reduced whereby surprisingly great strength may be obtained in spite of the relatively low overall density. For example, by applying the above principles, it is possible to produce a cement-fibre composition containing over 90% Portland cement, having only one-half the density and twice the strength of normal set and cured Portland cement. According to the principles of the invention, it is also possible to produce Portland cement products having densities as low as 30 pounds per cubic foot and less, which contain 80% and more of fine and of microscopic voids and still have appreciable strength.

An important advantage of the present invention is obtained when a fibrous cement pulp processed as described hereinabove, is dewatered and subjected to my new low pressures. Before the application of pressure, the matrix thus-formed has a much extended or very large volume and non-settling densities as low as 4 pounds per cubic foot can be obtained. This matrix is very readily compressible and by means of compression the cement particles are quickly brought into close relationship to one another. I have found that in direct contrast to prior notions generally prevailing among those skilled in the art, the above procedure is completely sufficient for producing ample strength in asbestos cement shingles. I have also found that when asbestos cement shingles were manufactured according to conventional processess and were subjected to high pressures such as 10,000 pounds per square inch pressure, for example, the pressure was again released to normal pressure before any cementation of the cement particles has taken place and all that has been accomplished was to bring the particles closer together at great trouble and expense.

A further important advantage resulting from the present invention and process is the fact that asbestos cement shingles made by the present low density process will not crack when subjected to repeated freezing and thawing. It is well-known that light weight or highly porous cement products are always subject to water penetration and extremely high moisture absorption and that when such cement products or shingles are saturated with water and subjected to freezing, they will crack. Shingles have been made by the present invention and process which had a moisture absorption as high as 38% and which did not crack when saturated with water and subjected to freezing and thawing. This is very surprising and is apparently due to the physical structure of the material resulting from the process.

I have likewise found that when the asbestos cement matrix is formed according to my invention, satisfactory asbestos cement shingles can be made by using pressures as low as 10 to 50 pounds per square inch. This eliminates all expensive machinery including the bulky hydraulic press equipment required in the conventional process. Under these operating conditions of my process, satisfactory shingles having a density as low as approximately 60 pounds per cubic foot and lower have been produced, and 8" x 16" tapered shingles with a ½ to ¾" butt which weighed only approximately 2 pounds each, or 520 pounds per square have been produced.

In order to produce the desired amount of flocculating fibre substance which hereinafter for the sake of simplicity will be called a "medium of extension", by pulping asbestos fibre, I have found that in many cases, an amount of very fine colloidal material is produced. This amount of colloidal material is sufficient to interfere with the easy and rapid filtration which is desirable when carrying my invention into practice. This can be overcome by properly controlled pulping but the difficulty becomes more pronounced where extreme lightness of the finished product is desired and consequently a large proportion of medium of extension is needed. I have discovered another simple way of entirely eliminating this difficulty in using another fibrous material in addition to asbestos.

I have found that finely pulped wood or newspaper stock which is readily obtainable on the market at a very low price makes an excellent medium of extension. A medium of extension of the described character produces a large non-settling volume, has a good flocculating tendency, and provides good filtering conditions, to wit: promotes fast filtering, prevents loss of fines or clogging of the filter medium even under pressure, eliminates the necessity of a fine aperture filtering medium.

I have found that any part or all of the asbestos may be replaced by this cellulose pulp stock with satisfactory results and with important gains in economy. In view of the fact that the process of the invention relies practically entirely upon the Portland cement to provide the strength required in the finished product, it is unnecessary to embody relatively long asbestos fibres into the product in order to reinforce the same and all of the asbestos may be dispensed with where economy so demands. As little as 5% cellulose stock fibre medium of extension has been used with satisfactory results. Shingles made with over 90% Portland cement are weatherproof, frostproof, and fireproof. Of course, when, in order to obtain extreme lightness, fairly large percentages, for example, 15% or more, of cellulose stock fibre are used, the material will not be torchproof. If torchproof material is required asbestos has to be added in a quantity corresponding to the extent to which this requirement of fireproofness is to be met. Since the object of adding asbestos to the product is to make the product fireproof and not necessarily to increase the strength thereof, it is obviously both economical and proper to use cheap short fibred asbestos.

An important problem, that of excessive moisture absorption, had to be solved before a completely satisfactory shingle could be produced. A product prepared according to the above process was found to contain 80% voids at a density of 30 lbs. per cubic foot. When this product is compressed to half its volume, the density is 60 lbs. per cubic foot and the percent of voids is approximately 40% as determined by moisture absorption. If this material is again compressed to half its volume, it should obviously have approximately 20% voids, but the moisture absorption is even less than 1%. This means that the voids have become so small that the water will not enter them any more. The density of the product, however, is already increased to 120 lbs. per cubic foot. By manipulating the character and amount of medium of extension employed and thus affecting the size and percentage of voids, products have been produced for example, having 5% moisture absorption at a density of 108 lbs. per cubic foot, 8% moisture absorption at a density of about 90 lbs. per cubic foot, and the like. It is not possible, however, to obtain by any such manipulation, the low density necessary for architecturally correct shingles of about 75 lbs. per cubic foot or less, and still have the moisture absorption sufficiently low to be satisfactory for shingles.

I am aware that various compounds, soaps, and the like, and numerous methods have already been proposed for integrally waterproofing cement and concrete. Although some of these substances were more or less effective in conventional products, it was soon ascertained that preventing water penetration into a cement fibrous product having a density of only 60 lbs. per cubic foot presents a problem altogether different from that of reducing the moisture absorption of normal cement of concrete having a relatively small percentage of voids and at least twice the density of my product. For example, one of the best compounds of that type on the market was found to be entirely ineffective in my cement fibrous products of low density and caused a moisture absorption of 45% after a 24 hour immersion of shingles made with 8% of the compound.

In order to provide a practical solution of this problem, a low cost material had to be found which could be manipulated and used in a simple manner. I have discovered that by melting paraffin and pouring same under high speed mixing into an approximately equal volume of boiling water containing a small amount of a dispersing agent, preferably a soluble soap, and continuing the high speed agitation until the mixture has cooled and the paraffin solidified, the paraffin is obtained in a convenient and exceedingly effective form of a paste. This paraffin paste is then mixed at a high speed with the medium of extension used in the process, with or without the addition of asbestos. If my paraffin paste is thus incorporated in the amount of 2% to 4% of the total weight of the finished product, satisfactory results are obtained with cement fibre compositions having densities of 50 to 70 lbs. per cubic foot and more. Thus, according to the present invention low density cement asbestos shingles may be produced which meet every essential requirement, including that of low moisture absorption.

In carrying out my invention in practice, conventional machinery and equipment may be used with few and slight modifications. The first operation, the pulping and mixing, may be carried out in a Hollander. By adjusting the cutting blades and by controlling the length of time during which the pulp is subjected to this action, the desired amount of medium of extension may be produced according to requirements at all times. For ascertaining the amount of medium of extension present, the height of the non-settling volume of a sample of the aqueous suspension as compared to that of a standard sample may be taken as a guide. Generally speaking, a non-settling volume in which the cement fibre mix will assume a final density of about 6 lbs. per cubic foot will provide good low density results.

The second operation, that of dewatering and of forming the matrix, can be carried out on a number of types of paper making machines used in the manufacture of asbestos cement shingles, where no accentuated thickness of the finished product is required. However, the complex and expensive apparatus required for the conventional processes is not at all necessary to carry out my process. In the simplest case, all that is needed is to run the required amount of pulp mix into rectangular boxes of about 8" x 16", the bottoms of which are made of foraminous or of perforated sheet metal. These boxes may be run along on a conveyor and filled while passing under an appropriate discharge opening. As the boxes move along the conveyor, the clear water quickly filters off leaving a matte or sheet of material in the box. If a colored surface is desired, a spray of aqueous color suspension containing a small amount of white cement may be directed on the sheets. The boxes are then run into a machine where a plunger comes down onto the surface of the sheet and compresses the sheet to the desired thickness. As it has been noted hereinabove, the sheet compresses very readily, requiring only a small pressure, for example, about 20 to 150 pounds per square inch. The excess water is forced out through the perforations in the bottom of the box. To obtain high speed operation, it is preferred to apply a vacuum to the bottom of the box simultaneously with pressing the sheet so that the excess water is immediately removed. The compression plunger may be provided with a facing plate bearing such corrugations, marks, grain effects, and the like, as is desired in the surface of the finished product. A plurality of small projections may be provided on the facing plate which punch holes in the shingle while it is being pressed. As soon as the shingle has been pressed, it can be discharged and set away to cure, after which it is ready for shipment. The whole cycle of manufacturing operations can be carried out in a few minutes and with a sufficient number of boxes, a properly installed conveyor and pressing machine, quantity production at a low cost may be maintained. To make tapered shingles, it is merely necessary to tilt the conveyor on which the boxes are carried, and of course tilt the pressing plunger to the proper angle. In this manner all of the complicated and expensive machinery required in the conventional processes is eliminated including the paper-making machine, the hydraulic press equipment, and the stamping and cutting machines.

The products obtained by my process are entirely different and readily distinguished from conventional products. The shingle prepared by the present process has an entirely novel and different physical structure, which is visibly obvious. My improved shingle is uniform throughout, there are no clusters of asbestos in local spots and other local areas where there is very little asbestos in the cement. Such segregation causes weak and brittle areas in conventional shingles. Therefore, to get a sufficiently high overall strength in the conventional processes the whole shingle must be subjected to an enormous pressure so that these weak areas will be sufficiently increased in strength. Another reason for the present requirements of high pressure, which is in the last analysis due to the uneven distribution of materials, is that in the conventional products the pressure does not distribute itself evenly throughout the matrix because certain areas are more readily compressible than others. In testing out shingles now on the market, I have found the tensile strength and rupture modulus to vary over several hundred percent for different sections of the same shingle and for different shingles of the same manufacturer although in the case of laminated asbestos cement shingles this effect is less pronounced. In contrast to conventional products, the shingle according to the invention is substantially uniform throughout. The physical structure is what may be described as a honeycomb type of structure. My improved shingle contains in general less asbestos and may not contain any at all. Likewise, the density of my improved shingle is lower and thickness greater for equal weight shingles, and its thermal conductivity is decidedly lower.

It is to be observed that the process of the invention provides numerous important advantages. By use of the present process, it is possible for the first time to produce an architecturally correct asbestos cement shingle having no greater weight than the present $\tfrac{3}{16}''$ conventional shingle and at no greater cost.

It is also to be noted that aside from actual savings effected by the present process, the capital investment requirements for equipment to carry the present invention into practice are very much less than those heretofore required for hydraulic press equipment and the plant required in conventional processes, and, accordingly, considerable additional savings may be effected by the present invention for this reason.

A further important advantage of my process is the benefit gained by providing a thick shingle constituted of a material having a relatively low density. The thermal conductivity of a low-density material is obviously always much lower than that of a high density material. As a matter of fact, the thermal conductivity of conventional asbestos cement shingles of the trade is about 2.7 B. t. u./sq. ft./hr./deg. F./in., whereas the thermal conductivity of my material will run from about 0.45 to about 1 and to less than about 1.9 for densities below 80 lbs. per cubic foot. This makes my improved material about 3 to 6 times as effective as an insulator of heat. Moreover, since my shingles are frequently as much as 3 times as thick as conventional shingles, they will therefore provide about 9 to 18 times greater protection against heat and cold.

It is likewise to be observed that the present invention provides a low-density asbestos cement shingle having a modulus of rupture which is about 800 to about 4,000 and about 1,000 to about 2,500 pounds per square inch and which has been found to be ample and satisfactory. Furthermore, it has been found that this strength bears a relation to the density such that the thickness of a shingle may be increased by reducing the density and nevertheless the over-all strength is satisfactory for practical purposes.

Furthermore it is to be observed that the present invention provides a process of producing a cement-fiber shingle especially a low density hydraulic cement-fiber shingle which comprises forming a dilute aqueous suspension containing about 70 to about 90% of hydraulic cement, a dispersed water-repellent compound, and up to about 20% fibrous material containing a sufficient amount of short flocculating fibers whereby a large settled volume of pulp is formed when intimately mixed with said hydraulic cement, dewatering said dilute aqueous suspension to form a cement-fiber matrix, and subjecting the thus-formed matrix to a pressure of very materially less than 4,000 pounds per square inch to produce a substantially uniform structure containing a multiplicity of microscopic voids in excess of about 25% of the total volume and distributed substantially uniformly throughout the same and having a moisture absorption of less than 25%.

Moreover it is to be observed that the present invention provides a new article of manufacture comprising a hydraulic cement-fiber shingle comprising a substantially uniform structure containing a multiplicity of fine voids in excess of 25% of the total volume and distributed substantially uniformly throughout the same and having a moisture absorption of less than about 25%, said structure comprising about 70% to about 90% hydraulic cement, about 5% to about 20% fiber and a water-repellent compound distributed substantially uniformly throughout said structure without detrimentally affecting the aforesaid percentage of voids.

Although the present invention has been described in connection with a few selected embodiments thereof, various modifications and variations will suggest themselves to those skilled in the art without departing from the principles of the present invention. I consider all of these variations and modifications to be within the true spirit and scope of the present invention, as disclosed in the present description, and defined by the appended claims.

Thus, a medium of extension may be any fibrous substance capable of producing a large settled volume of pulp when intimately mixed with a major portion of hydraulic cement in a dilute aqueous suspension. Generally speaking, the fibrous substance is composed of short fibres and will exhibit a flocculating tendency. These short fibres are individual fibres and have a substantial length with respect to their diameter. Similarly, low pressure is a pressure obtainable in practice without the use of customary hydraulic press equipment and very materially below 4,000 pounds per square inch. In general, pressures from about 10 to about 500 pounds per square inch have given best results. The range might be exceeded somewhat when the pressure is applied for a very short period of time and when limited filtration conditions exist causing a hydrostatic pressure to be set up in the shingle while under this pressure. The result is always a low density shingle. By low density is meant a density below about 95 pounds per cubic foot and generally lying between about 50 and about 30 pounds per cubic foot. A density at which moisture absorption ordinarily becomes excessive in conventional practice for making asbestos-cement shingles, but is limited by the use of the principles of the present invention. Similarly, a "water-repellent compound" means paraffin or other similar dispersed water-repellent compounds.

I claim:

1. As a new article of manufacture, a low density shingle comprising essentially a hydraulic cement-fibre composition constituted of a substantially uniform structure containing a multiplicity of microscopic voids in excess of 25% of the total volume and distributed substantially uniformly throughout the same, and containing a water-repellent compound, said composition having a moisture absorption of less than about 25%.

2. As a new article of manufacture, a low density hydraulic cement-fibre shingle constituted of a substantially uniform structure containing a water-repellent compound and containing a multiplicity of microscopic voids in excess of 25% of the total volume, said voids and water-repellent compound being distributed substantially uniformly throughout the same, said structure having a moisture absorption of less than about 25%, and a density less than about 95 pounds per cubic foot.

3. As a new article of manufacture, a hydraulic cement-fibre shingle comprising a substantially uniform structure containing a multiplicity of fine voids in excess of 25% of the total volume and distributed substantially uniformly throughout the same and having a moisture absorption of less than about 25%, said structure comprising about 70% to about 90% hydraulic cement, about 5% to about 20% fibre and a water-repellent compound distributed substantially uniformly throughout said structure without detrimentally affecting the aforesaid percentage of voids.

4. As a new article of manufacture, a hydrulic cement-fibre shingle constituted of a substantially uniform structure containing a multiplicity of microscopic voids in excess of 25% of the total volume and distributed substantially uniformly throughout the same and having paraffin distributed substantially uniformly throughout the cement-fibre without detrimentally affecting the aforesaid percentage of voids, said shingle having a moisture absorption less than 25%.

5. As a new article of manufacture, a low density hydraulic cement-fibre shingle constituted of a substantially uniform structure containing a multiplicity of microscopic voids in excess of 25% of the total volume and distributed substantially uniformly throughout the same and having up to about 6% of paraffin disributed substantially uniformly throughout the cement-fibre without detrimentally affecting the aforesaid percentage of voids, said shingle having a moisture adsorption less than 25%.

6. As a new article of manufacture, a low density hydraulic cement-fibre shingle constituted of a substantially uniform structure containing a multiplicity of microscopic voids in excess of 25% of the total volume and distributed substantially uniformly throughout the same and containing asbestos and cellulosic fibres and a water-repellent compound, said shingle having a moisture absorption of less than about 25%.

7. As a new article of manufacture, a low density hydraulic cement-fibre shingle constituted of a substantially uniform structure containing a multiplicity of fine voids in excess of 25% of the total volume and distributed substantially uniformly throughout the same and containing a water-repellent compound without detrimentally affecting the aforesaid percentage of voids, said structure having a moisture absorption of less than about 25% and a modulus of rupture within a range of about 800 to about 4,000 pounds per square inch.

8. As a new article of manufacture, a low density hydraulic cement-fibre shingle constituted of a substantially uniform structure containing a water-repellent compound and a multiplicity of microscopic voids in excess of about 25% and up to about 80% of the total volume, said voids and water-repellent compound being distributed substantially uniformly throughout the same and said structure having a density varying from about 95 pounds per cubic foot to about 30 pounds per cubic foot and having a moisture absorption less than 25%.

9. As a new article of manufacture, a shingle for exposure to weather, comprising a low density, hardened hydraulic cement-fibre composition layer containing a water-repellent compound, said layer having a substantially uniform structure including substantially uniformly distributed fibre and substantially uniformly distributed unfilled microscopic voids whose total volume constitutes at least about 25% of the total volume of said layer, said layer having a density of about 95 pounds per cubic foot or less and having a moisture absorption of less than about 25% by weight of said layer after 24 hour immersion in water.

10. As a new article of manufacture, a shingle for exposure to weather, comprising a low density hardened hydraulic cement-fibre composition layer containing a uniformly distributed water-repellent compound resisting water penetration, said layer having a substantially uniform structure including a substantially uniform distribution of the fibre and characterized by substantial freedom of large size voids but containing uniformly distributed unfilled minute voids whose total volume is not less than about 25% of the total volume of said layer, said layer having a density between about 50 to about 95 pounds per cubic foot and having a modulus of rupture substantially between 800 to 4,000 lbs. per square inch.

11. As a new article of manufacture, a shingle comprising a low density layer consisting of a hardened hydraulic cement-fibre composition containing a uniformly distributed water-repellent compound resisting water penetration, said layer having a substantially uniform structure including substantially uniformly distributed fibre and substantially uniformly distributed unfilled microscopic voids, whose total volume is substantially in excess of about 25% of the total volume of said layer, said layer having a density of about 95 pounds per cubic foot or less, a modulus of rupture not less than about 800 pounds per square inch and a unit thermal conductivity less than about 2.0 B. t. u.'s per square foot per hour per degree F. per inch.

12. As a new article of manufacture, a shingle for exposure to weather comprising a low density layer consisting of hydraulic cement, a small amount of fibre aggregate and a minor portion of water-repellent compound, said layer having a substantially uniform structure with a substantially uniform distribution of said materials and having substantially uniformly distributed unfilled microscopic voids formed in manufacture, whose total volume is substantially in excess of 25% of the total volume of said layer, said layer having a density substantially between about 50 to about 95 pounds per cubic foot and having a moisture absorption of less than about 25% by weight of said layer after 24 hour immersion in water.

13. As a new article of manufacture, a low density hardened hydraulic cement-fibre layer consisting principally of cement and fibrous aggregate, and including at least 2% of paraffin and at least 5% of short fibre, said layer having a substantially uniform structure including a substantially uniform distribution of said ingredients and having substantially uniformly distributed unfilled microscopic voids, whose total volume is substantially in excess of about 25% of the total volume of said layer, said layer having a density of about 95 pounds per cubic foot or less and a moisture absorption of less than about 25% by weight of said layer after 24 hour immersion in water.

14. A low pressure process of producing low density hydraulic cement-fibre shingles which comprises forming a dilute aqueous suspension containing a major portion of hydraulic cement, a water-repellent compound, and fibrous material containing a sufficient amount of short flocculating fibres forming a large settled volume of pulp of not less than about 4 pounds per cubic foot when intimately mixed with said hydraulic cement, dewatering said dilute aqueous suspension to form a cement-fibre matrix, and subjecting the thus-formed matrix to a low pressure to produce a finished cement-fibre shingle constituted of a substantially uniform structure containing a multiplicity of microscopic voids in excess of 25% of the total volume and distributed substantially uniformly throughout the same and having a moisture absorption of less than 25%.

15. A low pressure process of producing low density hydraulic cement-fibre shingles, which comprises forming a dilute aqueous suspension containing about 70 to about 90% of hydraulic cement, a dispersed water-repellent compound, and up to about 20% fibrous material containing a sufficient amount of short flocculating fibres whereby a large settled volume of pulp is formed when intimately mixed wtih said hydraulic cement, dewatering said dilute aqueous suspension to form a cement-fibre matrix, and subjecting the thus-formed matrix to a pressure of very materially less than 4,000 pounds per square inch to produce a finished cement-fibre shingle constituted of a substantially uniform structure containing a multiplicity of microscopic voids in excess of about 25% of the total volume and distributed substantially uniformly throughout the same and having a moisture absorption of less than 25%.

16. A low pressure process of producing low density cement-fibre layer adapted for use as a shingle, which comprises pulping fibrous material containing a sufficient amount of short flocculating fibres in water to produce a large non-settling volume of pulp of an aqueous suspension of about 4 pounds per cubic foot to about 6 pounds per cubic foot, incorporating a hydraulic cement and a dispersed water-repellent compound in said pulp, said cement constituting about 70 to about 90% of the dry weight of the mixture of cement and fibre, dewatering said dilute aqueous suspension to form a cement-fibre matrix, and subjecting the thus-formed matrix to a pressure of considerably less than about 4,000 pounds per square inch to produce pressed cement-fibre shingle layer constituted of a substantially uniform structure containing a multiplicity of microscopic voids in excess of 25% of the total volume and distributed substantially uniformly throughout the same and having a moisture absorption of less than 25%.

17. A process of producing hydraulic cement-fibre shingles, which comprises adding molten paraffin to about an equal volume of hot water containing a small amount of dispersing agent while subjecting the same to high speed mixing to form a paraffin mass, adding said paraffin mass to a dilute aqueous suspension containing a major portion of hydraulic cement and fibrous material capable of producing a large settled volume of pulp when the fibres are intimately mixed with said hydraulic cement, dewatering said dilute aqueous suspension to form a cement-fibre matrix, and subjecting the thus formed matrix to a pressure of considerably less than about 4,000 pounds per square inch to produce a cement-fibre shingle layer constituted of a substantially uniform structure containing a multiplicity of fine voids in excess of about 25% of the total volume and distributed substantially uniformly throughout the same and having a moisture absorption of less than 25%.

18. A low pressure process of producing low density hydraulic cement-fibre shingles, which comprises forming a dilute aqueous suspension containing about 70 to about 90% of hydraulic cement, a dispersed water-repellent compound, and up to about 20% fibrous material including asbestos and cellulose short flocculating fibres thereby producing a large settled volume of pulp when the fibres are intimately mixed with said cement, dewatering said dilute aqueous suspension to form a cement-fibre matrix, and subjecting the thus-formed matrix to a pressure of considerably less than about 4,000 pounds per square inch to produce a cement-fibre shingle layer constituted of a substantially uniform structure containing a multiplicity of microscopic voids in excess of about 25% of the total volume and distributed substantially uniformly throughout the same and having a moisture absorption of less than 25%.

19. A process of producing a low density cement-fibre shingle layer comprising selecting fibre having in dilute aqueous suspension with hydraulic cement, a non-settling volume of not greater than about 6 pounds per cubic foot, intimately mixing in dilute aqueous suspension cement and a substance including at least 5% of fibre having the aforesaid characteristic, intimately dispersing in the suspension a water-repellent compound, forming a cement-fibre matrix of the suspension by removal of liquid, pressing and drying the said matrix to density between about 50 to about 95 pounds per cubic foot.

20. A process of producing a cement-fibre shingle having a moisture absorption of less than 25%, comprising intimately mixing in dilute aqueous suspension hydraulic cement and fibre, including in said suspension at least five percent of fibre having in dilute aqueous suspension with hydraulic cement a non-settling volume of not greater than about 6 pounds per cubic foot in a dry state, adding to said suspension and uniformly distributing therethrough without detrimentally affecting the cementitious qualities of said cement, a paraffin composition consisting of a mixture of melted paraffin, hot water, and a dispersing agent, forming a matrix of the suspension by removal of the liquid phase, and pressing the matrix to a predetermined density.

21. A process of producing cement-fibre shingles having a moisture absorption of less than 25% which comprises forming a dilute aqueous suspension containing about 70 to about 90% of hydraulic cement, a dispersed water-repellent compound, and about 5 to about 20% of fibrous material including short flocculating fibres whereby a large settled volume of pulp is produced when intimately mixed with said cement, incorporating about 2% to about 6% of a water-repellent compound in said suspension without detrimentally affecting the cementitious qualities of said cement, forming a cement-fibre matrix containing said water-repellent compound uniformly distributed therethrough from said suspension by removal of the liquid phase, and pressing said matrix to a predetermined density to produce said cement-fibre shingle.

CHARLES SCHUH.

CERTIFICATE OF CORRECTION.

Patent No. 2,156,310. May 2, 1939.

CHARLES SCHUH.

It is hereby certified that error appears in the printed specification of the above numbered patent requiring correction as follows: Page 2, second column, line 8, for "importantce" read importance; line 38, for "colse" read close; page 4, second column, line 27, after the word and period "cost." insert the following paragraph -

Moreover the present invention provides a novel shingle having a special constitution. Among the compositions employed for producing the novel shingle the following may be mentioned:

(1) About 15% of pulp (new stock), about 81% of cement, and about 4% of paraffin;

(2) About 5% of asbestos fibres, about 10% of pulp, about 81% of cement and about 4% of paraffin; and (3) About 8% of asbestos fibres, about 88% of cement and about 4% of paraffin.;

page 5, second column, line 27, claim 4, for "hydrulic" read hydraulic; and that the said Letters Patent should be read with this correction therein that the same may conform to the record of the case in the Patent Office.

Signed and sealed this 17th day of October, A. D. 1939.

(Seal)

Henry Van Arsdale,
Acting Commissioner of Patents.